(12) United States Patent
Dewey et al.

(10) Patent No.: US 7,081,193 B2
(45) Date of Patent: Jul. 25, 2006

(54) MULTI-STACK ISOLATION DETECTION SYSTEM

(75) Inventors: Scott Dewey, Dansville, NY (US); John Wheat, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 709 days.

(21) Appl. No.: 10/360,998

(22) Filed: Feb. 7, 2003

(65) Prior Publication Data

US 2004/0157091 A1    Aug. 12, 2004

(51) Int. Cl.
*C25B 15/02*    (2006.01)
(52) U.S. Cl. .............. 205/337; 205/335; 204/401; 204/406; 429/23; 429/12; 429/13; 361/88; 324/522; 324/525
(58) Field of Classification Search .......... 205/337, 205/335; 204/401, 406; 429/23, 12, 13; 361/88; 324/525, 522
See application file for complete search history.

(56) References Cited

U.S. PATENT DOCUMENTS 4,871,956 A * 10/1989 Barrella ................. 320/135
6,764,782 B1 * 7/2004 Raiser et al. ............ 429/13

* cited by examiner

*Primary Examiner*—Bruce F. Bell
(74) *Attorney, Agent, or Firm*—Cary W. Brooks

(57) ABSTRACT

A system for detecting an isolation fault in a multi-stack fuel cell system. The system determines the percentage of the voltage from each stack in the multi-stack that contributes to the voltage at a positive terminal and a negative terminal of the stack when a no-fault condition exists. The system then uses those percentages and the actual measured stack voltages to determine if a fault condition exists. The actual voltage measurement at the positive terminal is compared to the calculated voltage contribution from each stack at the positive terminal for the no-fault condition. Also, the actual voltage measurement at the negative terminal is compared to the calculated voltage contribution from each, stack at the negative terminal for the no-fault condition. If there is a significant enough different between the calculated voltage for a no-fault condition and the calculated percentage of the actual voltage measurements, than a fault condition exists.

21 Claims, 9 Drawing Sheets

MULTI-STACK ISOLATION DETECTION SYSTEM

BACKGROUND OF THE INVENTION

1. Field of the Invention

This invention relates generally to fault isolation detection system and, more particularly, to a fault isolation detection system for a multi-stack fuel cell system.

2. Discussion of the Related Art

Hydrogen is a very attractive source of fuel because it is clean and can be used to efficiently produce electricity in a fuel cell. The automotive industry expends significant resources in the development of, hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle. Many fuels cells are combined in a stack, and several stacks are electrically coupled in series, to generate the desired power.

FIG. 1 is a schematic plan view of a fuel cell stack 10. The stack 10 is enclosed in a housing 12. Several fuel cell stacks are configured in a multi-stack system. A coolant loop flows within the housing 12 to cool the stacks during operation. The stack 10 includes a positive terminal (anode) 14 and a negative terminal (cathode) 16 that are electrically coupled to the respective terminals of the stacks within the housing 12. The resistance $R_n$ identifies a negative conductive path between the negative terminal 16 and ground through the coolant loop, and the resistance $R_p$ identifies a positive conductive path between the positive terminal 14 and ground through the coolant loop. It is known that the resistance $R_n$ will be significantly greater than the resistance $R_p$.

Fault isolation detection systems are sometimes employed in electrical systems to isolate persons from the electrical circuit therein. Fault isolation detection systems provide fault detection so that if the person does come in contact with high voltage portions of the circuit, the system will detect the event and open a circuit within a few milliseconds to prevent the person from being injured. Fuel cell systems are one electrical system that employ fault isolation detection systems to prevent a person from being electrocuted by the system, such as coming in contact with the positive terminal 14 or the negative terminal 16 and ground, such as the vehicle chassis. The known isolation detection systems for a fuel cell system prevent a current feed-back path from the negative terminal 16 to the positive terminal 14, and vice versa. For example, resistors are provided to limit the current flow between the positive terminal 14 and ground and the negative terminal 16 and ground.

FIG. 2 is a schematic diagram of a classical electrical isolation system 20. A voltage source 22 provides the voltage potential available to the system 20. The system 20 includes a voltage divider 24, having resistors $R_1$ and $R_2$, where $R_1$ equals $R_2$. The resistor $R_1$ is a current limiting device between the positive terminal of the voltage source 22 and ground, and the resistor $R_2$ is a current limiting device between the negative terminal of the voltage source 20 and ground. A resistor $R_3$ is electrically coupled to the voltage divider 24 between the resistors $R_1$ and $R_2$ and ground, as shown. The values of the resistors $R_1$, $R_2$ and $R_3$ are selected to provide a balanced current loop, as discussed below, when a no-fault condition exists. The resistors $R_1$ and $R_2$ typically have a value of 500 k ohms or higher and the resistor $R_3$ has a value of approximately 2.5 k ohms.

The resistor $R_3$ is used to detect an isolation failure or fault condition. A voltage drop is monitored across the resistor $R_3$, where the value of the voltage drop when the system 20 is isolated is very small. When a fault condition occurs, the voltage drop across the resistor $R_3$ increases, and peripheral circuitry, such as an operational amplifier 26, measures the voltage increase and provides an output signal. For example, if a person simultaneously touches the positive or negative terminal of the source 22 and ground, the electrical balance provided by the resistors $R_1$ and $R_2$ is upset, and an increased voltage-drop occurs across $R_3$. The voltage drop is measured by the amplifier 26 to indicate a fault condition. The resistor $R_4$ represents the person simultaneously touching the positive terminal of the voltage source 22, and ground that unbalances the voltage divider 24 to provide the voltage drop across the resistor $R_3$. The voltage drop across the resistor $R_3$ is an indication of the amount of current that is traveling through the new resistance path, i.e., the person. Circuitry can be electrically coupled to the output of the amplifier 26 to open a circuit and remove the current flow before the person is injured.

When detecting isolation faults in a single stack fuel cell system, classical isolation techniques can be employed. FIG. 3 is a schematic diagram of a circuit 28 showing the classical isolation technique in FIG. 2, and including the resistances $R_p$ and $R_n$ identified above. The combination of the resistors $R_1$, $R_2$, $R_p$, and $R_n$ define a Wheatstone bridge. In this design, the resistors $R_1$ and $R_p$ will have the same value and the resistors $R_2$ and $R_n$ will have the same value. By determining the ratio of the resistances $R_n/R_p$ in the single stack system, the resistors $R_1$ and $R_2$ can be sized to compensate for the imbalance between the positive and negative conductive paths in the coolant loop. In other words, even though the resistance $R_n$ will be greater than the resistance $R_p$, the values of the resistors $R_1$ and $R_2$ can be provided accordingly so that when there is a no-fault condition, there is a minimal voltage drop across the resistor $R_3$. Changes in the stack voltage will not affect the ratio of the balanced circuit. If a fault condition does occur where additional resistance is added to one of either $R_p$ or $R_n$ indicating a fault, then the Wheatstone bridge will become unbalanced, and a larger voltage drop will occur across the resistor $R_3$ that can be measured to indicate the fault condition.

The classical fault isolation detection technique discussed above is not adequate for a multi-stack fuel cell system where the several stacks are electrically coupled in series because there are multiple leakage paths within the coolant loop. In other words, because there are several resistive paths between ground and the respective terminal of each stack through the coolant loop, and the voltage of each stack is changing independently of the other stacks, a balanced system cannot be provided by the Wheatstone bridge in FIG. 3 because the ratios between the resistances $R_n$ and $R_p$ will be different for the several stacks.

FIG. 4 is a general schematic diagram of an electrical system 30 for a multi-stack fuel cell system showing the positive resistance $R_p$ and voltage sources $V_1$–$V_4$ identifying the voltages for four stacks in the multi-stack. A terminal 32 is the positive terminal of the multi-stack and a terminal 34 is the negative terminal of the multi-stack. A voltage potential exists between the positive terminal 32 and chassis ground and the negative terminal 34 and chassis ground. A voltage Vs is the voltage potential of the multi-stack between the terminals 32 and 34. The voltage from the voltage sources $V_1$–$V_4$ is varying in time relative to each other. Because the negative resistances $R_{n1}$–$R_{n4}$ are relatively high compared to the positive resistances $R_{p1}$–$R_{p4}$ of the stacks, they are negligible for the isolation detection purposes discussed herein, and have been eliminated. The negative resistance $R_n$ for the last stack is shown because a positive resistance $R_p$ does not follow it.

FIGS. 5(*a*)–5(*d*) show the electrical system 30 superimposed into four separate circuits 36–42, respectively, where a single voltage source 44 is positioned at each location of the voltage sources $V_1$–$V_4$.

FIG. 6 is a schematic diagram of a fault isolation detection circuit 46 including the electrical system 30 and a voltage divider 48 made up of resistors $R_5$, $R_6$ and $R_7$ to provide isolation detection of the type discussed above for a multi-stack fuel cell system. The value of the resistors $R_5$, $R_6$ and $R_7$ can be selected so that the circuit 46 is electrically balanced for a particular output voltage for each stack. However, because there are several voltage sources in a multi-stack system, there are multiple current paths that can create an imbalance in the isolation circuit 46. The changing voltages cause varying voltage drops across the resistances $R_{p1}$–$R_{p4}$ and $R_n$, thus the voltage drop across the resistor $R_5$ changes dramatically. This identifies the problem in that the stacks are still considered isolated, but the detection circuit 46 would show a fault condition and shut the system down.

SUMMARY OF THE INVENTION

In accordance with the teachings of the present invention, a system and method for detecting an isolation fault in a multi-stack fuel cell system is disclosed. The system determines the percentage of the voltage from each stack in the multi-stack that contributes to the voltage at a positive terminal of the multi-stack, and adds those voltage percentages to determine what the voltage at the positive terminal should be when a no-fault condition exists. The system also determines the percentage of the voltage from each stack in the multi-stack that contributes to the voltage at a negative terminal of the multi-stack, and adds those voltage percentages to determine what the voltage at the negative terminal should be when a no-fault condition exists. The system then uses those percentages and the actual measured stack voltages to determine if a fault condition exists.

The system uses one or both of the actual voltage measurements at the positive terminal and the negative terminal of the multi-stack relative to chassis ground, and compares the measured voltage to the added voltage percent contribution from each stack for the positive terminal and the negative terminal for the no-fault condition. If there is a significant enough difference between the known added voltage contribution from each stack for the positive and/or negative terminal for a no-fault condition and the actual voltage measurements at the positive and/or negative terminal, then a fault condition exists.

Additional advantages and features of the present invention will become apparent from the following description and appended claims, taken in conjunction with the accompanying drawings.

DETAILED DESCRIPTION OF THE INVENTION

The following discussion of the embodiments of the invention directed to a system and method for detecting isolation faults in a multi-stack fuel cell system is merely exemplary in nature, and is in no way intended to limit the invention or its applications or uses.

Figure 1:
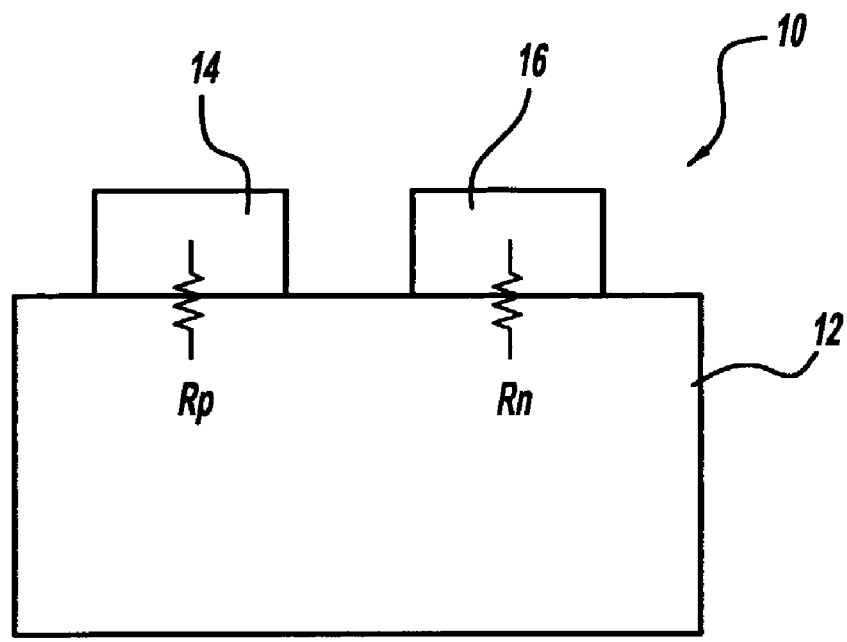
FIG. 1 is a plan view of a fuel cell stack system showing the resistances between the stack anode and ground through the coolant loop and the stack cathode and ground through the coolant loop.
Figure 2:
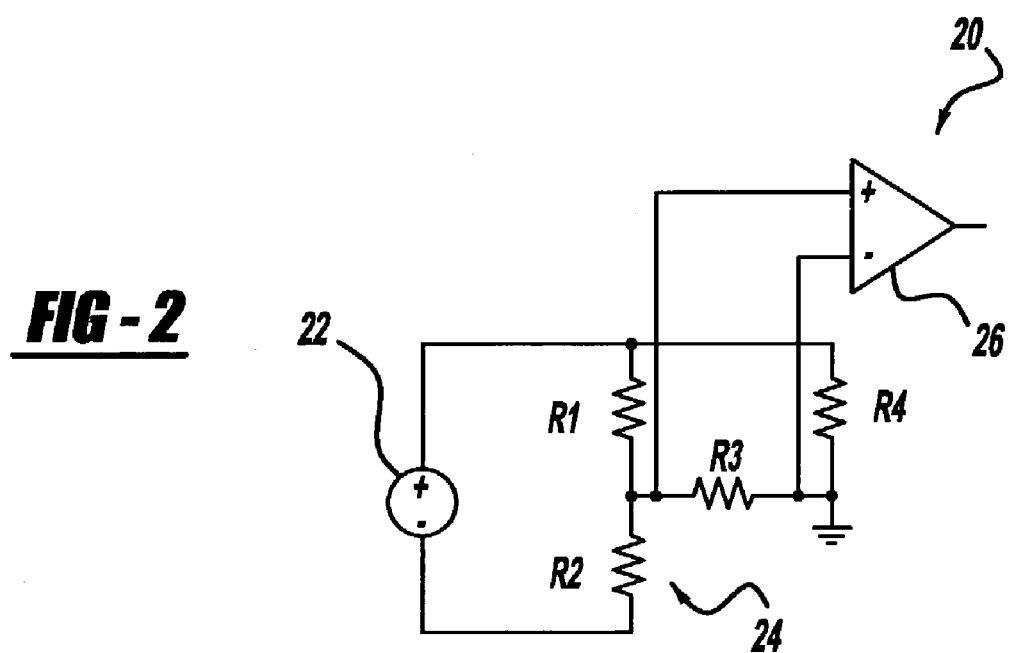
FIG. 2 is a schematic diagram of a known fault isolation detection circuit.
Figure 3:
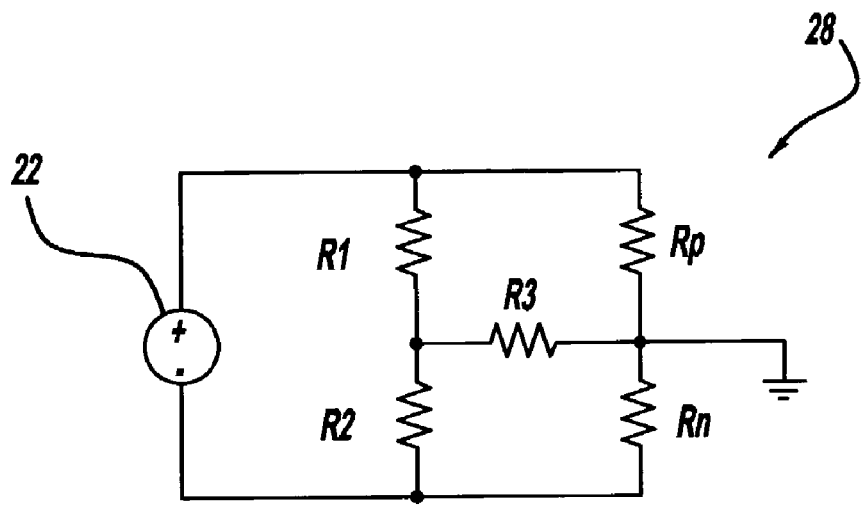
FIG. 3 is a schematic diagram combining the isolation detection circuit shown in FIG. 2 and the resistances shown in FIG. 1.
Figure 4:
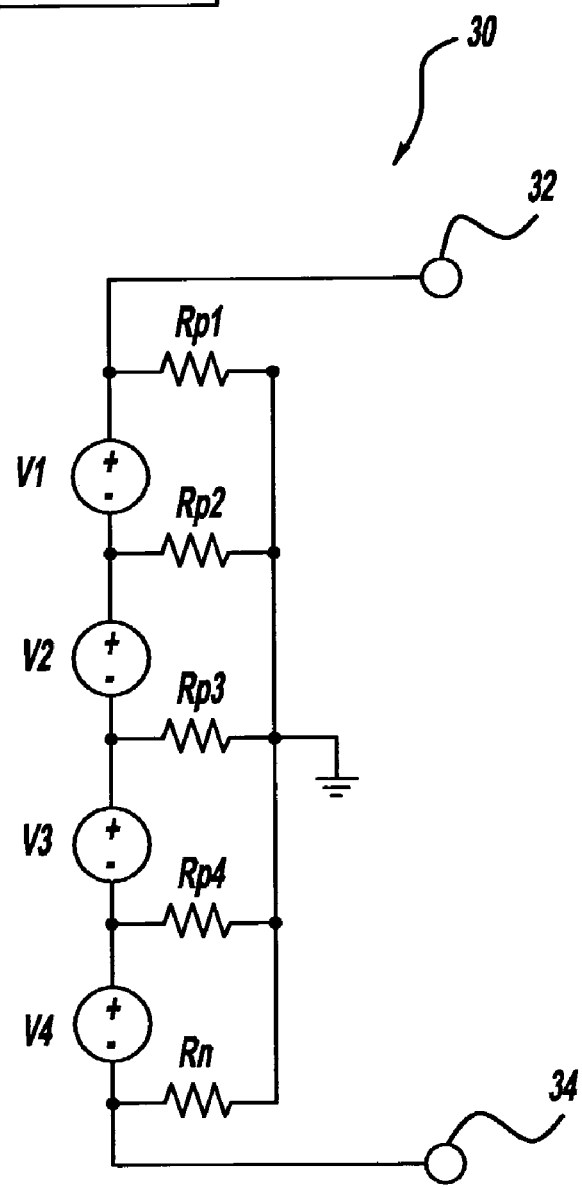
FIG. 4 is a schematic diagram showing an electrical system for a multi-stack fuel cell system.
Figure 5A:
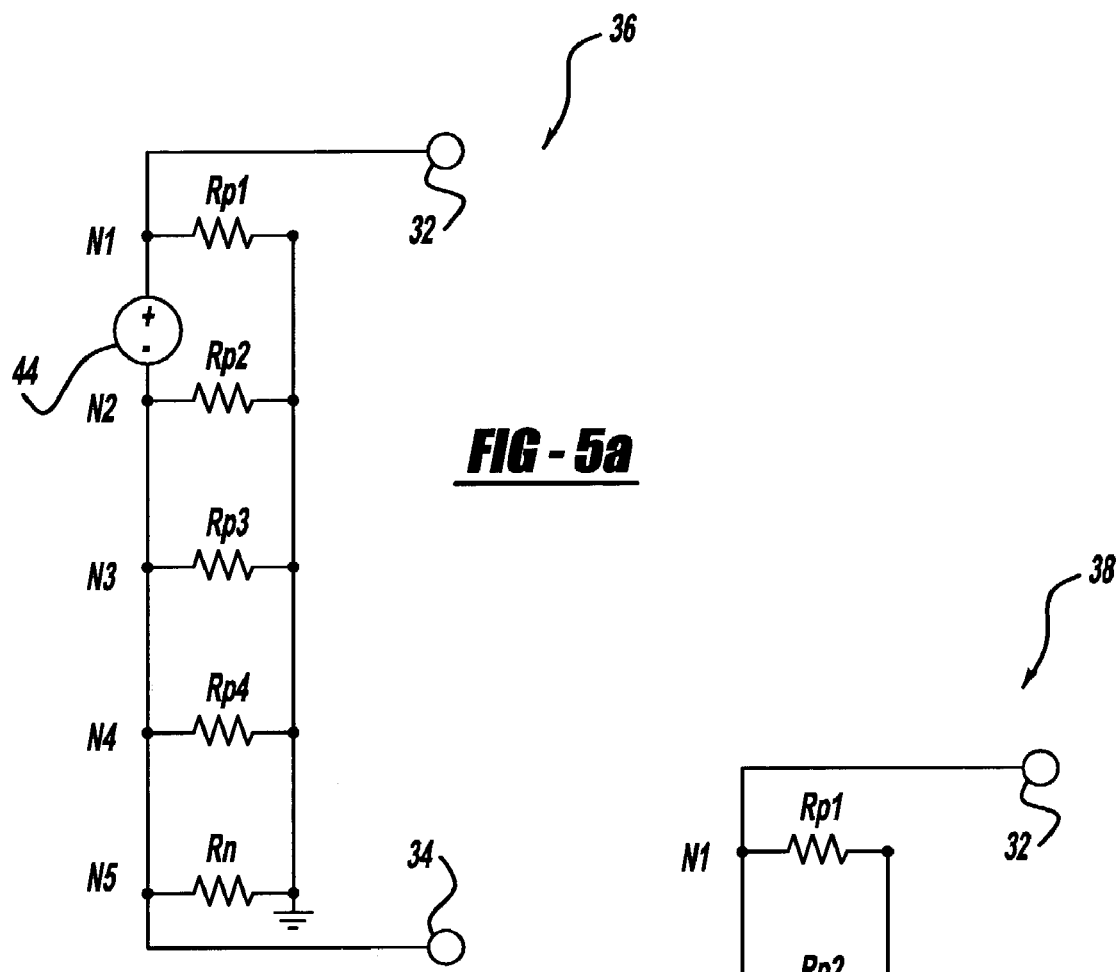
FIGS. 5(*a*)–5(*d*) are schematic diagrams of the electrical system for the multi-stack fuel cell system shown in FIG. 4 where a voltage source is superimposed at the stack voltage source locations.
Figure 5B:
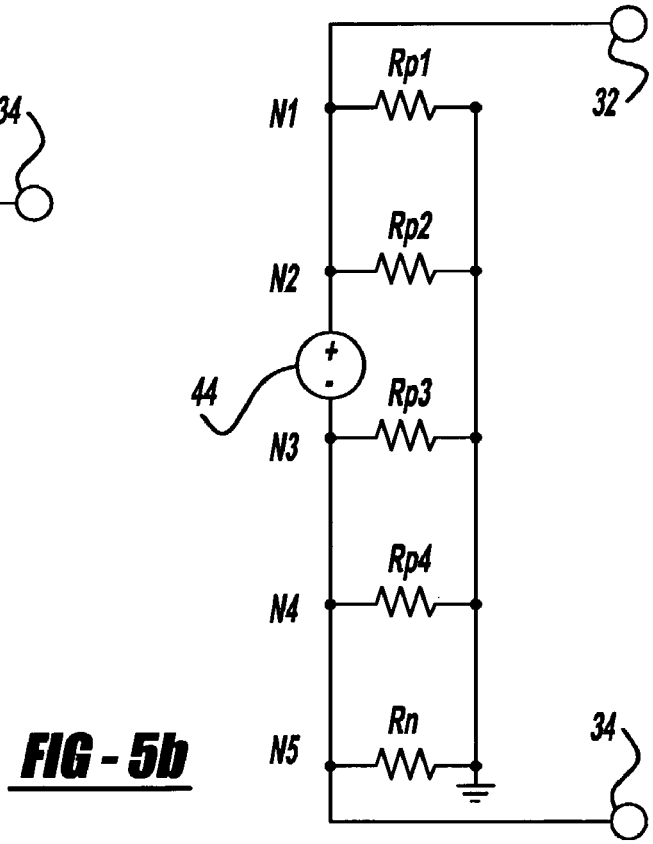
Figures 5C, 5D:
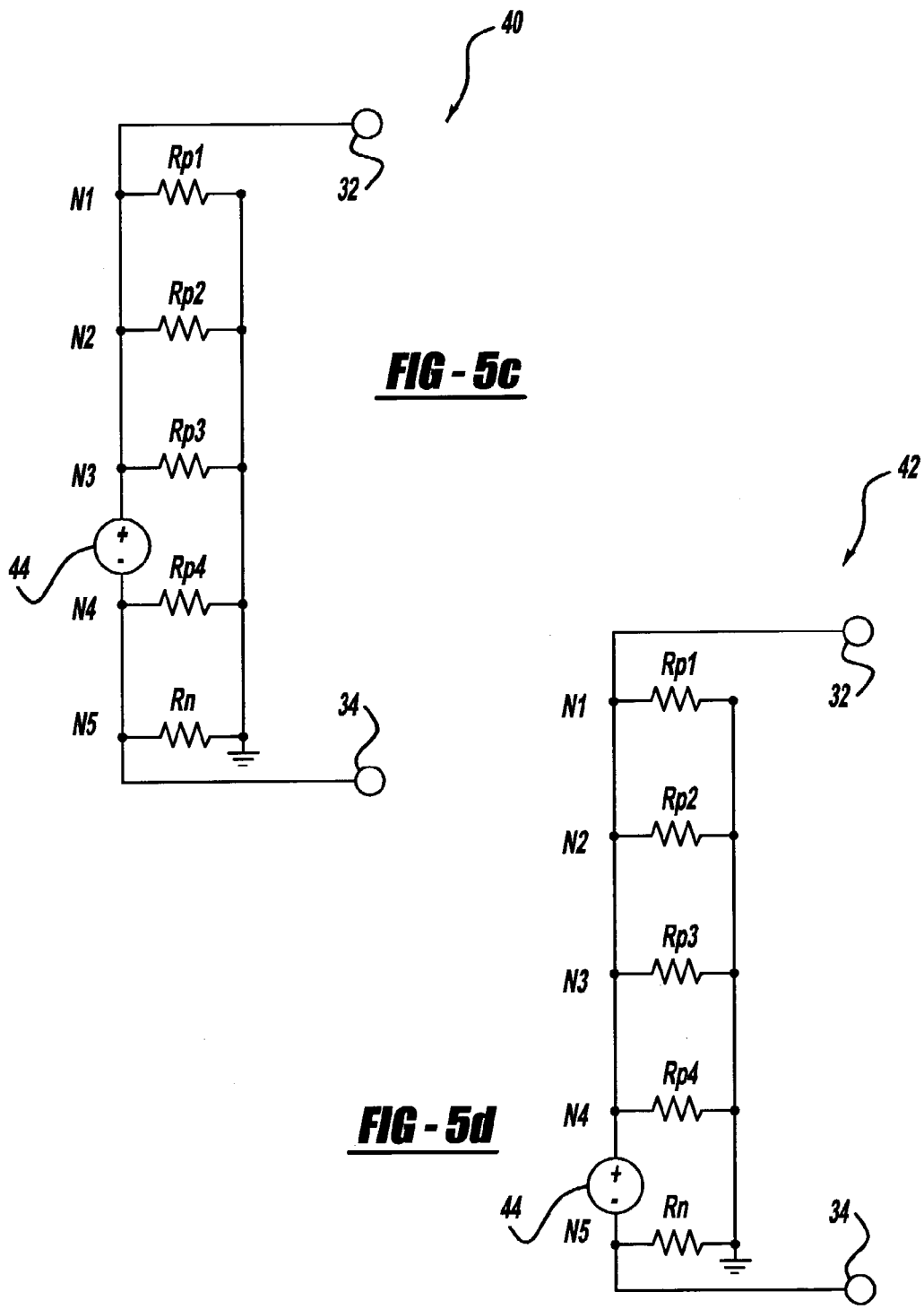
Figure 6:
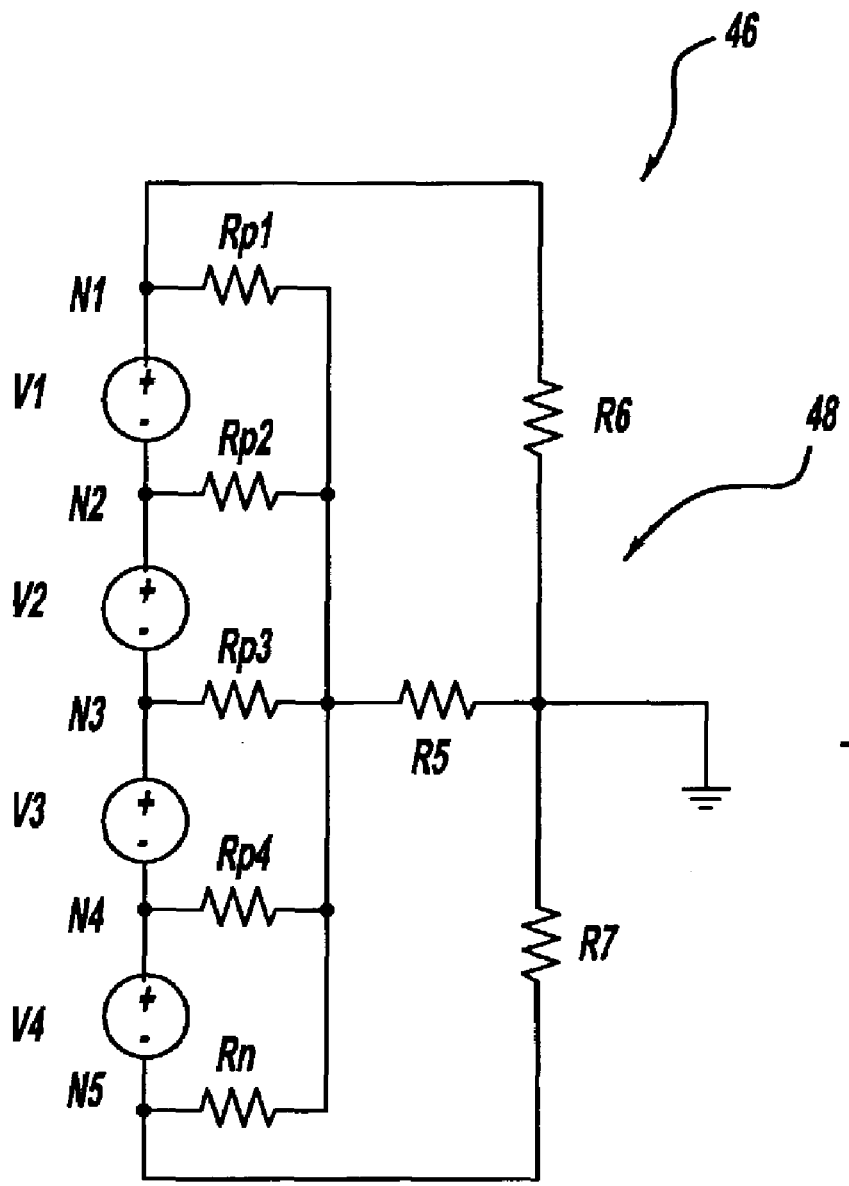
FIG. 6 is a schematic diagram of a known isolation detection circuit including the electrical system for a multi-stack fuel cell system.

The present invention determines a fault condition of a multi-stack in a fuel cell system by knowing what percentage of the voltage from eac stack contributes to the voltage at the positive terminal 32 and the negative terminal 34 of the stack when a no-fault condition exists, and using those voltage percentages and the actual stack voltage measurements to determine if a fault condition does exist. Table I below gives the percentage of the voltage contribution from each stack $V_1$–$V_4$ at nodes $N_1$–$N_5$ in FIG. 4 for the no-fault condition. The contribution of the voltage from each stack $V_1$–$V_4$ for each node $N_1$–$N_5$ is added together to give the ratio of $V_s$ contributed by that node, as shown in the last row. The voltage at the node $N_1$ is the voltage across the resistor $R_{p1}$ (positive terminal) and the voltage at the node $N_5$ is the voltage across the resistor $R_n$ (negative terminal).

The actual voltage measurement across $R_{p1}$ at the positive terminal 32 of the multi-stack relative to chassis ground is compared (subtracted) to the calculated voltage contribution from each stack at the node $N_1$. Also, the actual voltage measurement across $R_n$ at the negative terminal 34 of the multi-stack relative to chassis ground is compared to the voltage contribution from each stack at the node $N_5$. If there is a significant enough difference between the calculated voltage across $R_{p1}$ and $R_n$ for a no-fault condition and the actual voltage measurements, then a fault condition exists. In other words, each one of the stack voltages is periodically measured and a predetermined ratio of that value is determined for the positive terminal of the multi-stack and the negative terminal of the multi-stack. Then, the actual voltage potential at the positive terminal of the stack and the negative terminal of the stack are measured and compared to the calculated ratio to determine if a fault condition exists.

TABLE I

|  | $N_1$ | $N_2$ | $N_3$ | $N_4$ | $N_5$ |
|---|---|---|---|---|---|
| $V_1$ | .75 $V_1$ | −0.25 $V_1$ | −0.25 $V_1$ | −.25 $V_1$ | −.25 $V_1$ |
| $V_2$ | .5 $V_2$ | .5 $V_2$ | −0.5 $V_2$ | −.5 $V_2$ | −.5 $V_2$ |
| $V_3$ | .25 $V_3$ | .25 $V_3$ | .25 $V_3$ | −.75 $V_3$ | −.75 $V_3$ |
| $V_4$ | 0 | 0 | 0 | 0 | −$V_4$ |
| $V_s = V_1 = V_2 = V_3 = V_4$ | 3/2 $V_s$ | .5 $V_s$ | −1/2 $V_s$ | −3/2 $V_s$ | −5/2 $V_s$ |

Figure 7:
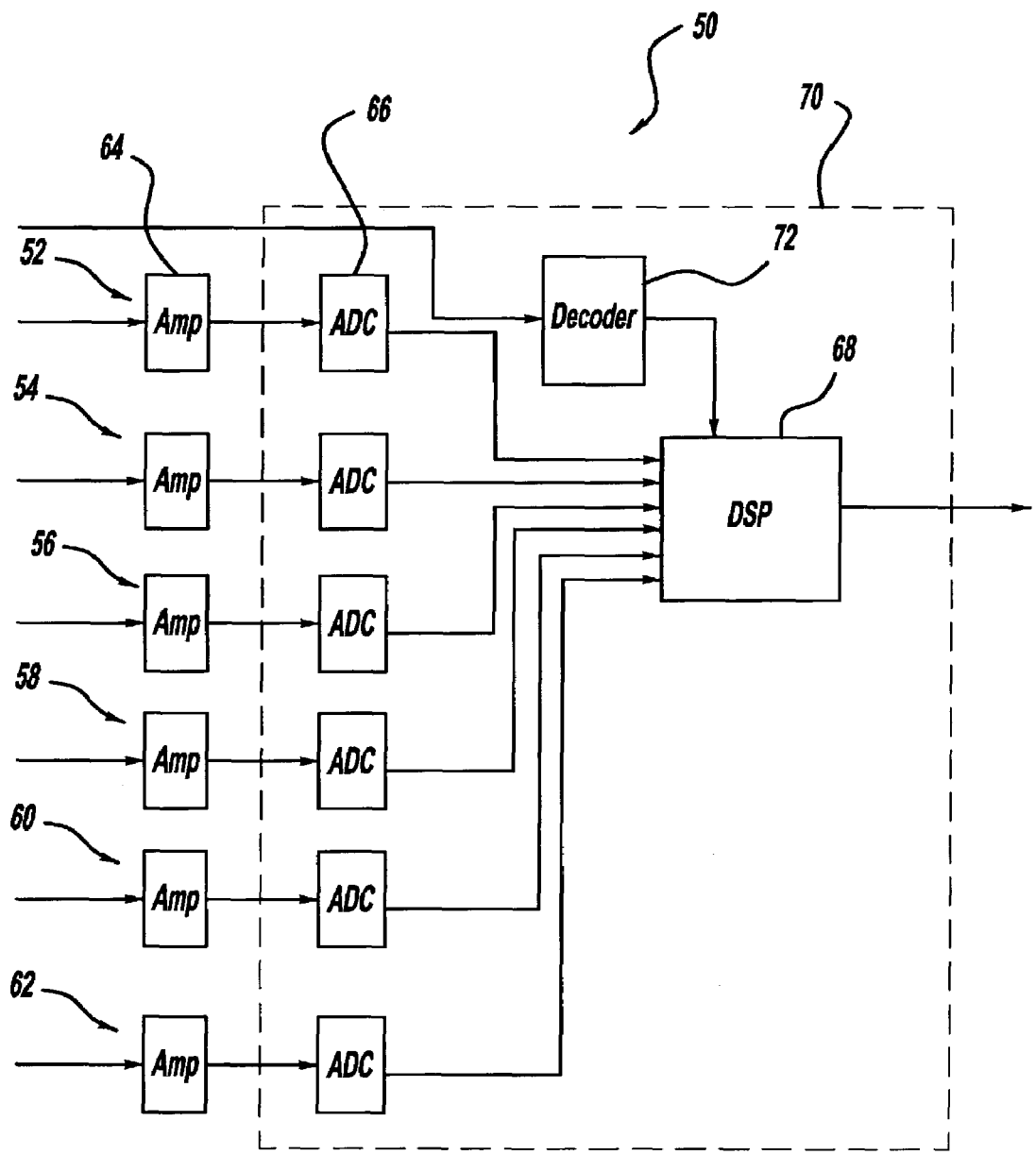
FIG. 7 is a schematic block diagram of a fault isolation detection system, according to an embodiment of the present invention.

FIG. 7 is a schematic block diagram of a system 50 for detecting isolation faults in a multi-stack fuel cell system in the manner discussed above, according to an embodiment of the present invention. The system 50 includes four stack stages 52–58, where each stage 52–58 receives a voltage output from one of the stacks in the fuel cell system. Four stacks are by way of example in that the fuel cell system can have any suitable number of stacks. A stage 60 receives an output voltage from the positive terminal of the first stack and the vehicle chassis (reference ground), i.e., across $R_{p1}$, and a stage 62 receives an output voltage from the negative terminal of the last stack and the vehicle chassis, i.e., across $R_n$. This provides all of the voltages necessary to make the ratio calculations identified in Table I.

The analog input voltage is applied to an amplifier 64 in the stages 52–62 to amplify the voltage to a suitable level. The amplified voltage is then applied to an analog-to-digital converter (ADC) 66 to convert the analog signal to a digital signal. The digital signal is applied to a digital signal processor (DSP) 68 where the voltage signal ratios are calculated, and compared to the no-fault condition ratios, as discussed above, to detect a fault condition. The ADCs 66 and the DSP 68 are fabricated on an on-board DSP integrated circuit (IC) 70. An enable signal is applied to a decoder 72 on the IC 60 and the decoded enable signal is applied to the DSP 68 to enable it.

Figure 8:
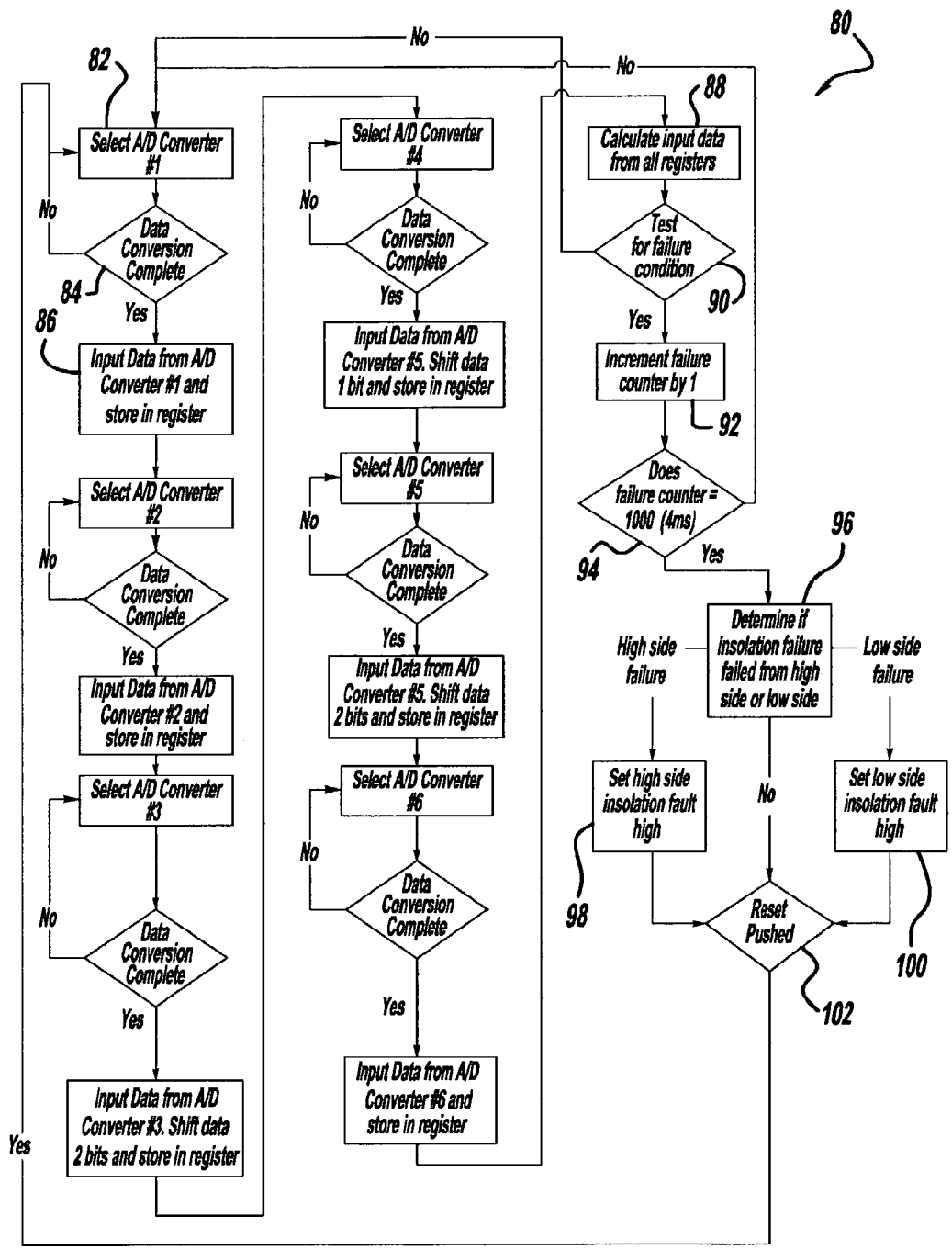
FIG. 8 is a flow chart diagram showing the process for detecting isolation fault conditions, according to the invention.

FIG. 8 is a flow chart diagram 80 showing the process of detecting a fault in a multi-stack fuel cell system by the system 50, according to an embodiment of the present invention. The DSP 68 first selects the input of the ADC 66 in the first stage 52 at block 82. The DSP 68 then determines if the analog to digital conversion has been completed at decision diamond 84. If the digital conversion is not complete, then the process returns to the block 82. If the digital conversion is complete, the DSP 68 stores the measured voltage value from the ADC 66 in a register in the DSP 68 at block 86. The process then selects and stores the measured voltage values from each of the other stages 54–62 sequentially, and stores the value in a register in the DSP 68, as shown in the flow diagram 80.

The DSP 68 uses the stack voltage values stored in the registers to determine their voltage contributions to the nodes $N_1$ and $N_5$ at block 88 using the ratios identified in Table I above. The DSP 68 then compares the actual voltage measurements at the positive terminal of the multi-stack across the resistor $R_{p1}$ and the actual voltage measurement at the negative terminal of the multi-stack across the resistor $R_n$ to the calculated voltage values based on the ratios from each of the stacks $V_1$–$V_4$ at decision diamond 90 to determine if a failure condition exists. If the calculated values and the actual voltage values are within a predetermined value, then a failure condition does not exist, and the DSP 68 returns to the block 82 to start the calculation process over. If the calculated voltage values and the actual voltage values are too far apart, then a failure condition does exist.

If a failure condition is detected, the DSP 68 increments a failure counter by one at block 92. The DSP 68 does not set a fault condition until the failure condition is detected for a predetermined number of sequential operations by the process 80. The DSP 68 determines if the failure counter has reached a predetermined value at decision diamond 94. The predetermined value represents a certain time period that a failure condition has continued to occur to establish that a fault condition is occurring and action should be taken. In one embodiment, the value is 1000, which represents 4 ms. However, this is by way of a non-limiting example. If the failure condition continues for the predetermined period of time, then the DSP 68 will send a signal that causes the current to be removed from the fuel cell system to protect the user. By setting an isolation fault condition, the fuel cell system is immediately shut down.

The system also determines if the fault condition occurred at the high side or the low side of the stack at block 96 for diagnostic purposes. If the fault occurred at the high side, then the DSP 68 sets a high side isolation fault high at block 98. If the fault occurred at the low side, then the DSP 68 sets; a low side isolation fault high at block 100. When the system is powered back up after the fault condition is detected, a reset removes the isolation fault condition. The DSP 68 determines if the reset has been set at decision diamond 102. If the reset has been set, then the process returns to the block 82, and if the reset has not been set, then the process returns to the block 96.

Figure 9A:
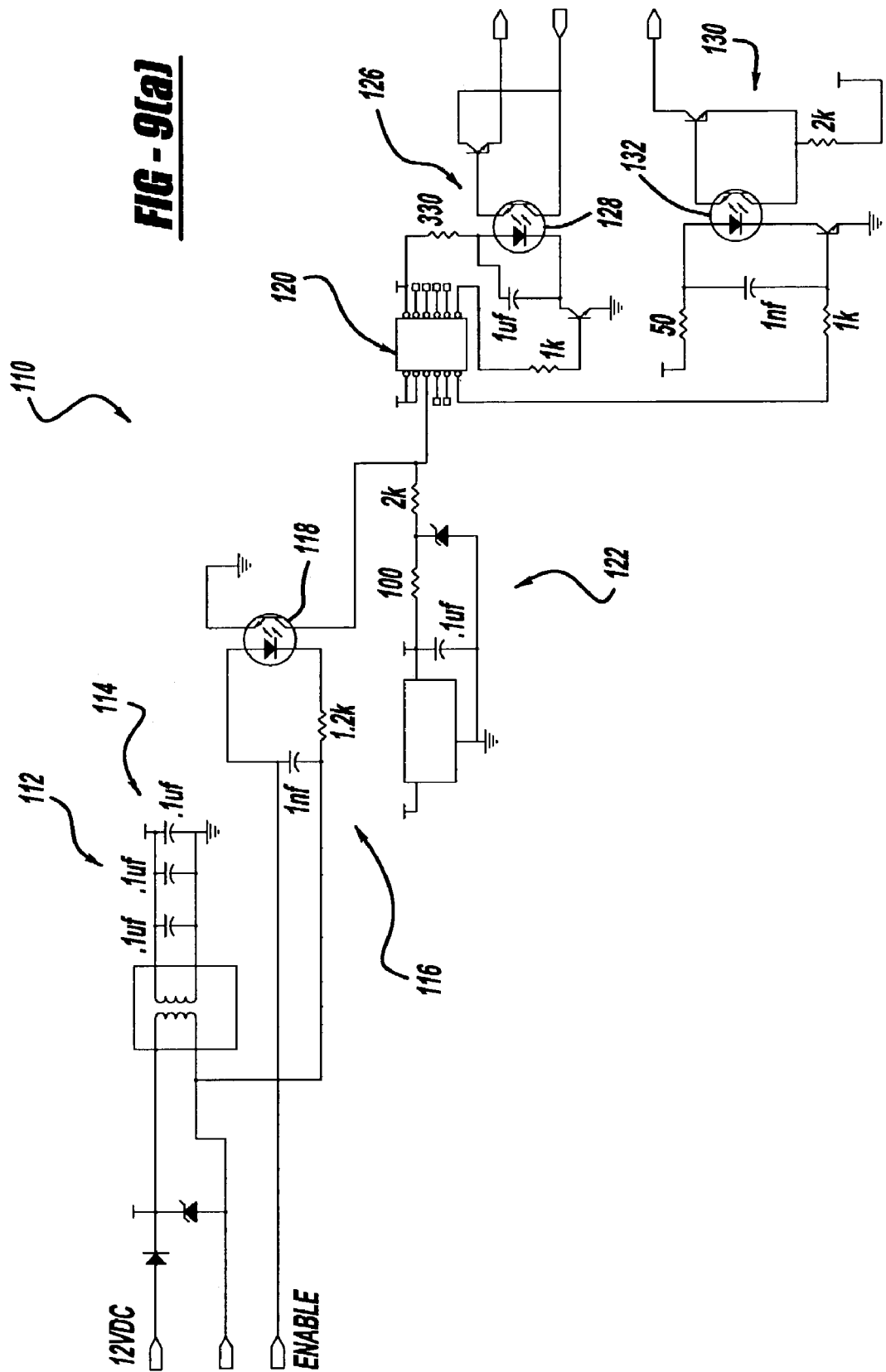
FIGS. 9(*a*) and 9(*b*) are a detailed schematic diagram of an isolation detection circuit for detecting isolation faults in a multi-stack fuel cell system, according to an embodiment of the present invention.
Figure 9B:
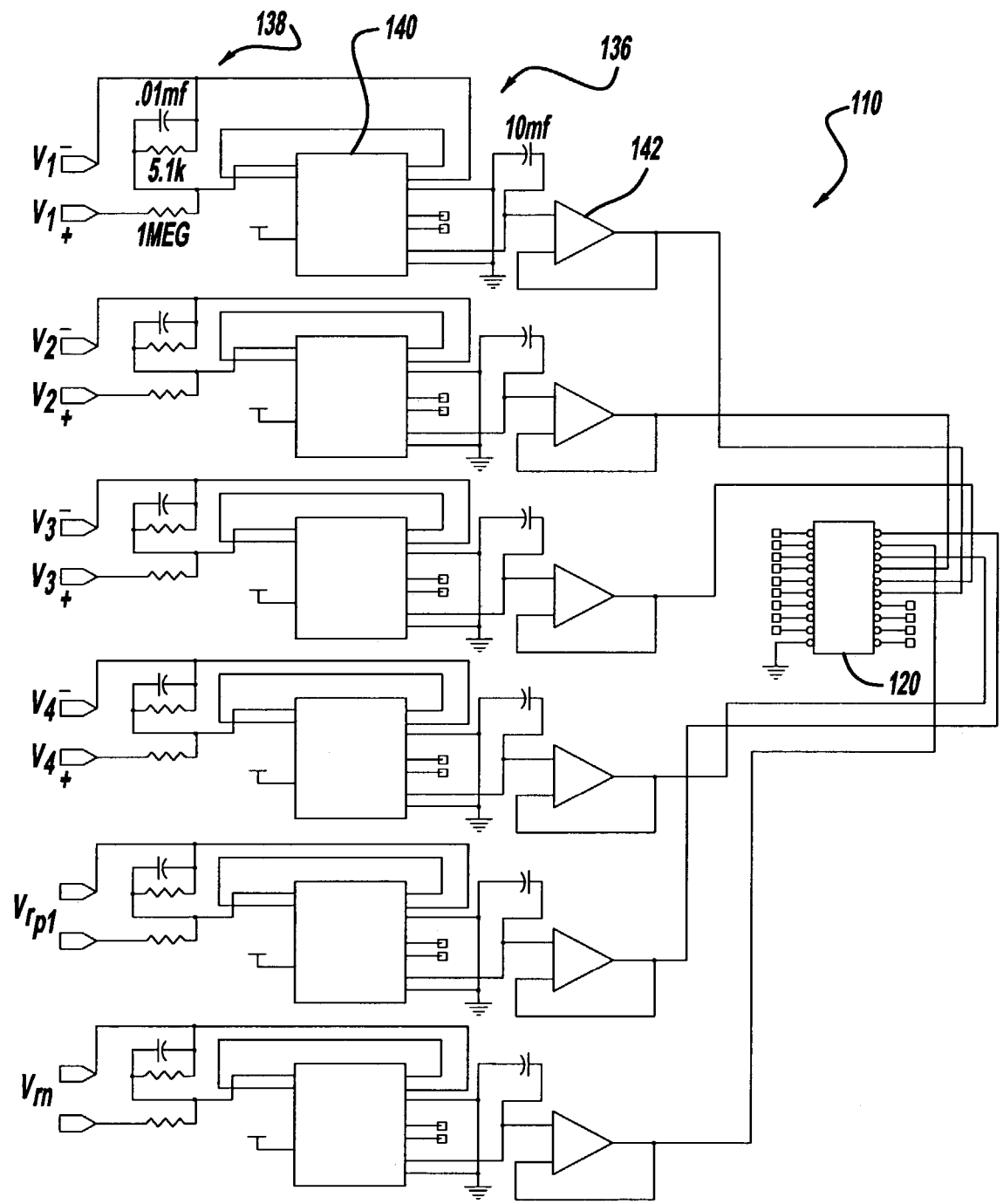

FIGS. 9(a) and 9(b) are a detailed schematic diagram of a circuit 110 for detecting isolation faults in a multi-stack fuel cell system, according to an embodiment of the present invention. The circuit 110 includes a DC/DC power source 112 including capacitor filters 114. An enable circuit 116 receives an enable signal to enable the circuit 110. The enable signal is applied to the high voltage side of an opto-isolator 118. The low voltage side of the isolator 118 is electrically coupled to an input p in of a DSP 120, representing the DSP 68 above, so that the circuit 110 is isolated from the high voltage. In one embodiment, the DSP 120 is a TMS 320LF2407A. However, this is by way of a non-limiting example in that the DSP 120 can be any processor suitable for the purposes discussed herein. The circuit 110 also includes a 5 volt power converter 122 electrically coupled to the power source 112 through the isolator 118 for down-converting the power to 5 volts.

A high voltage interlock loop circuit 126 is electrically coupled to the DSP 120. When the DSP 120 detects a fault condition, as discussed above, the DSP 120 provides an output signal to the loop circuit 126 to open the fuel cell circuit and stop the current flow therethrough. An opto-isolator 128 isolates the high voltage of the fuel cell circuit from the low voltage of the circuit 110. When a fault is detected, the DSP 120 also provides an output signal to the vehicle's universal controller through a fault output circuit 130. The output circuit 130 includes an opto-isolator 132 that isolates the circuit 110 from the higher voltage controller circuit.

The circuit 110 receives output voltage signals from the stacks in the multi-stack fuel cell, as discussed above. The circuit 110 includes a plurality of input stages 136, one for each stack, one for the positive end of the multi-stack and one for the negative end of the multi-stack. Only one of the stages 136 will be discussed herein with the understanding that the other stages operate in the same manner. The negative voltage from the stack is applied to a voltage divider and filter input circuit 138 to reduce the stack voltage applied to the circuit 110. The voltage divided input signal is then applied to an opto-isolator 140 that further isolates the high voltage of the stack from the circuit 110. In this embodiment, the isolator 140 is an AD202, but can be any suitable isolation device. The low voltage signal is then sent to a buffer amplifier 142 and the DSP 120. The ADCs are within the DSP 120.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fault isolation detection circuit for detecting a fault condition in a multi-stack fuel cell system, said circuit comprising:
    a plurality of stack input stages each being responsive to a voltage signal from a stack in the fuel cell system;
    a positive stack input stage responsive to a voltage signal from a positive terminal of the multi-stack relative to reference ground;
    a negative stack input stage responsive to a voltage signal from a negative terminal of the multi-stack relative to reference ground; and
    a processor responsive to the voltage signals from the input stages, said processor storing percentages of voltages from each of the plurality of stacks that contribute to a voltage at the positive terminal of the multi-stack and the negative terminal of the multi-stack for a no-fault condition, said processor determining whether the fault condition exists by calculating the percentages of the voltage contributions of each stack for the positive and negative terminals and comparing the calculated voltage contributions to the actual voltages at the positive and negative terminals of the multi-stack.

2. The circuit according to claim 1 wherein the processor determines the calculated voltage percentages and the stored voltage percentages by adding the voltage contribution from each stack to the positive terminal and the negative terminal of the multi-stack.

3. The circuit according to claim 1 wherein the voltage signal at the positive terminal of the multi-stack is a voltage drop between a positive terminal of a first stack in the multi-stack and reference ground through a coolant loop in the fuel cell system, and the voltage signal at the negative terminal of the multi-stack is a voltage drop between a negative terminal of a last stack in the multi-stack and reference ground through the coolant loop in the system.

4. The circuit according to claim 1 wherein the multi-stack fuel cell includes four stacks.

5. The circuit according to claim 4 wherein the voltage percentage of a first stack for the positive terminal is 0.75, the voltage percentage of a second stack for the positive terminal is 0.5, the voltage percentage of a third stack for the positive terminal is 0.25 and the voltage percentage of a fourth stack for the positive terminal is 0, and wherein the voltage percentage of the first stack for the negative terminal is −0.25, the voltage percentage of the second stack for the negative terminal is −0.5, the voltage percentage of the third stack for the negative terminal is −0.75 and the voltage percentage of the fourth stack for the negative terminal is −1.00.

6. The circuit according to claim 1 wherein the processor opens a circuit to remove current flow through the fuel cell system if a fault condition is detected.

7. The circuit according to claim 6 further comprising a high voltage interlock loop, said interlock loop being responsive to a signal from the processor when a fault condition is detected and removing the current flow from the fuel cell system in response thereto.

8. The circuit according to claim 7 wherein the interlock loop includes an opto-isolator for electrically isolating the rest of the circuit from the fuel cell system.

9. The circuit according to claim 1 wherein each stage includes a voltage divider circuit for reducing the voltage signal and an opto-isolator for isolating the reduced voltage signal from the rest of the circuit.

10. The circuit according to claim 1 further comprising an output circuit, said output circuit being responsive to a signal from the processor when a fault condition is detected to notify a universal controller of the fault condition.

11. The circuit according to claim 10 wherein the output circuit includes an opto-isolator for electrically isolating the rest of the circuit from the universal controller.

12. The circuit according to claim 1 wherein the multi-stack fuel cell system is on a vehicle.

13. A fault isolation detection circuit for detecting a fault condition in a multi-voltage source system, said circuit comprising:
    a plurality of source input stages each being responsive to a voltage signal from one of a plurality of sources in the system;
    a system input stage responsive to a voltage signal from a terminal of the system; and
    a processor responsive to the voltage signals from the input stages, said processor storing percentage of voltages from each of the plurality of sources that contribute to a voltage at the terminal of the system for a no-fault condition, said processor determining whether the fault condition exists by calculating the percentages of the voltage contributions of each source for the terminal and comparing the calculated voltage contributions to the actual voltage at the terminal of the source.

14. The circuit according to claim 13 wherein the processor determines the calculated voltage percentages and the stored voltage percentages by adding the voltage contribution from each source to the terminal of the system.

15. A method for detecting a fault condition in a multi-stack fuel cell system, comprising:
    determining percentages of voltages from each of a plurality of stacks in the multi-stack that contribute to a voltage at a positive terminal of the multi-stack and a negative terminal of the multi-stack for a no-fault condition;
    measuring a voltage from each stack in the fuel cell system;
    measuring a voltage from the positive terminal of the multi-stack in the fuel cell system;
    measuring a voltage from the negative terminal of the multi-stack in the fuel cell system;

calculating the percentages of the voltage contributions of each stack for the positive and negative terminals of the multi-stack; and comparing the calculated voltage contributions to the actual voltages at the positive and negative terminals of the multi-stack to determine if the fault condition exists.

16. The method according to claim 15 wherein determining the percentages of voltages from each of a plurality of stacks in the multi-stack and calculating the percentages of the voltage contributions of each stack include adding the voltage contributions from each stack for the positive terminal and the negative terminal of the multi-stack.

17. The method according to claim 15 further comprising removing a current flow from the fuel cell system in response to the fault condition.

18. The method according to claim 17 wherein removing the current flow includes removing the current flow only after the fault condition has been detected for a predetermined period of time.

19. The method according to claim 18 wherein the predetermined period of time is 4 ms.

20. The method according to claim 15 further comprising notifying a vehicle universal controller of the fault condition.

21. The method according to claim 15 further comprising determining whether the fault occurred at a high side or a low side of the multi-stack.

* * * * *